May 23, 1933. D. C. RUSSELL ET AL 1,910,477
ICE CREAM LIFT
Filed Jan. 12, 1931
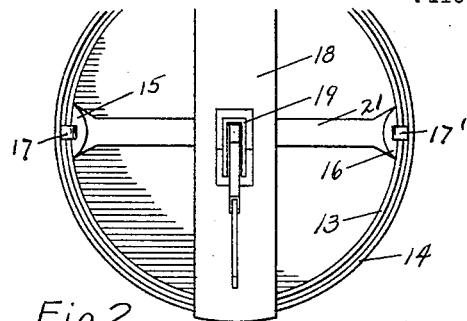
Fig. 2.
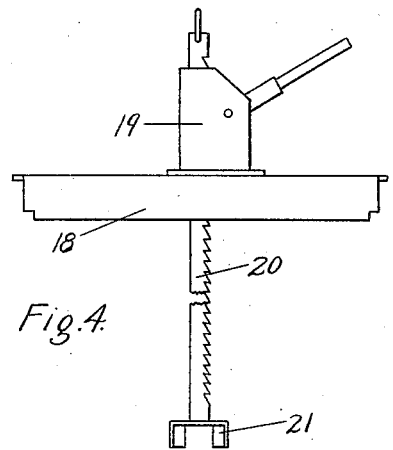
Fig. 4.
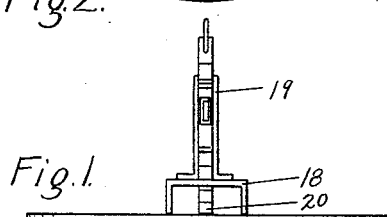
Fig. 1.
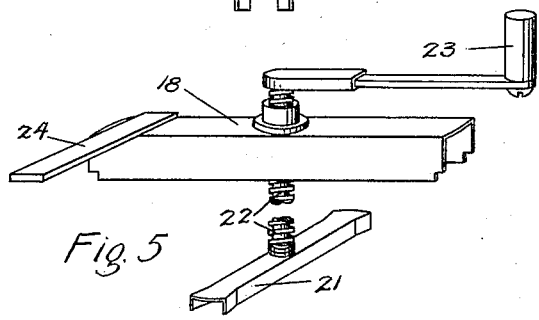
Fig. 5.
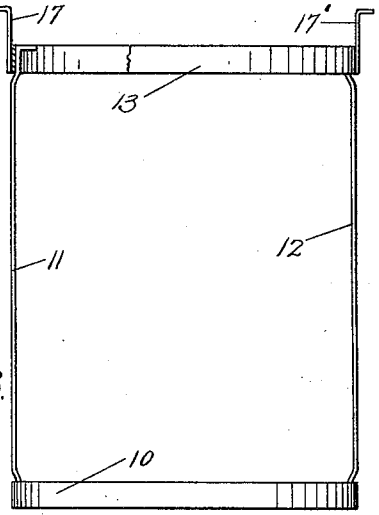
Fig. 3.
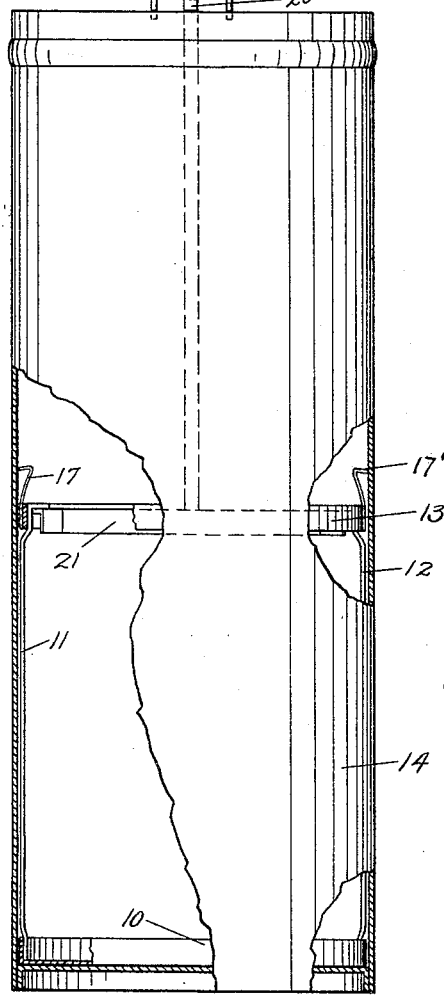
Inventor,
David C. Russell, and
Harman B. Woerner,
By Minturn & Minturn,
Attorneys.

Patented May 23, 1933

1,910,477

UNITED STATES PATENT OFFICE

DAVID C. RUSSELL AND HARMAN B. WOERNER, OF TERRE HAUTE, INDIANA

ICE CREAM LIFT

Application filed January 12, 1931. Serial No. 508,151.

This invention relates to the art of ice cream receptacles and particularly to means for elevating ice cream within the receptacle after a quantity has been removed from the upper part thereof.

Ice cream receptacles of the type employed to hold ice cream to be dispensed in bulk have quite a length as compared to their diameter and after about half of the ice cream has been removed, it is difficult to lean over and reach one's arm down into the can to dish out the remainder of the cream. Moreover it is extremely insanitary to have an operator extend his arm into the can and brush his sleeve around the can. Moreover it is extremely difficult to get the cream from out of the can near the bottom without getting it onto the sleeve and causing an unsightly appearance, particularly where the cream may be of dark color such as chocolate.

It is a primary object of our invention to provide inexpensive means for elevating the cream after the upper portion has been removed so that no time will the operator be obliged to reach into the can for more than half its length.

Another important object is to provide elevating means that may be employed in the present type of containers without having to alter them in any respect and without materially affecting the volume of the container.

Another important object of the invention is to provide elevating means in a very simple and inexpensive form and which will be externally durable over a long period of time.

These and other objects will become apparent in the following description of the invention as illustrated in the accompanying drawing, in which Fig. 1 is a fragmentary side elevation of an ice cream container to which our invention has been applied;

Fig. 2, a top plan view;

Fig. 3, a side elevation of the ice cream cage;

Fig. 4, a side elevation of the cage lifting unit; and

Fig. 5 is a perspective view of a modified form of the lifting unit.

Referring to the drawing, in which like characters of reference indicate like parts in the several views, we form a cage, Fig. 3, which has a bottom plate or pan 10, here shown as having a vertical annular flange therearound, and two straps 11 and 12 having their lower ends attached to the pan 10 and extending vertically therefrom to have their upper ends secured to a hoop or band 13. The external diameters of the pan 10 and the hoop 13 permit the cage to be dropped within an ice cream can or container 14, Fig. 1, with a very close sliding fit.

Lips 15 and 16 are turned horizontally inward from the upper ends of the straps 11 and 12, Fig. 2, and spring catches 17 and 17' are attached to the hoop 13 outside of the lips 15 and 16 to have their upper outturned ends normally pressed inwardly by the side wall of the container 14, Fig. 1.

A lifting unit is formed to have a cross bar 18 here shown as a channel member with the legs turned downwardly, and a lifting jack 19 mounted on the top side of the bar 18 to have a ratchet bar 20 extending vertically through the bar 18 and through the jack 19 to be raised and lowered by the jack in the manner well known to those versed in the art, the details of the jack itself not forming a part of our invention.

The undersides of the legs of the bar 18 are notched out to rest over the top edge of the receptacle 14 so that the bar will not be readily displaced longitudinally. A bar 21 is secured centrally to the lower end of the ratchet bar 20 and has an overall length which will permit it to be inserted within the can 14 and rotated to have its ends come under the lips 15 and 16 to the position as indicated in Fig. 2.

The cage as above referred to is dropped into the can 14 at the ice cream factory and the ice cream poured into the can and then frozen. At the place where the ice cream is to be dispensed, the ice cream is dipped from the top end of the can until it is lowered to expose the lips 15 and 16 at which time as is here indicated, substantially half of the ice cream has been removed from the can. The lifting unit is then placed over the can 14 to have the bar 18 rest on the top edge and the ratchet bar 20 is lowered to bring the bar 21 down and permit its being revolved to engage with the lips 15 and 16. The jack 19 is then operated to raise the bar 20 which action will lift the cage and this action is continued until the catches 17 and 17' come above the top edge of the can 14 and spring outwardly to vertically disposed positions to have their upper outturned ends fly out over the top edge of the can as means for holding the cage and the ice cream resting thereon in the upper elevated position. The lifting unit may then be removed by revolving the bar 18 to turn the ratchet bar 20 and the lower bar 21 to disengage the lower bar from under the lips 15 and 16.

In place of the type of jack as shown in Fig. 4, a simple screw shaft 22 may be employed and screw-threadedly carried by the bar 18. In this case the lower bar 21 would be swivelly connected to the end of the screw shaft 22 and the shaft would be revolved by a handle 23. To prevent rotation of the bar 18 around the top edge of the can 14 with this type of elevating means, we supply a foot 24 secured to one end of the bar 18 which may bear against the side wall of a cabinet (not shown).

While we have here shown and described our invention in the one best form as now known to us, it is obvious that structural changes may be made in that form without departing from the spirit of the invention and we, therefore, do not desire to be limited to that precise form, nor any more than may be required by the following claims.

We claim:

1. For an ice-cream can, an ice-cream lift comprising a lower plate, straps extending vertically upwards from the plate, lips inturned from the upper ends of the straps and a lifting unit comprising a bar adapted to rest on the can top edge, lifting means supported by the car, and a bar member raised and lowered by the lifting means, said bar member being adapted to engage said lips.

2. For an ice-cream can, an ice-cream lift comprising a lower plate, straps extending vertically upwards from the plate, lips inturned from the upper ends of the straps and a lifting unit comprising a bar adapted to rest on the can top edge, lifting means supported by the bar, and a bar member raised and lowered by the lifting means, said bar member being adapted to engage said lips, and spring catches above the straps adapted to engage over the top edge of the can when the plate is elevated.

3. For an ice-cream lift, the combination with a can, of an ice-cream cage comprising a lower pan, a pair of straps extending vertically upwards from the pan, a hoop secured to the top ends of the straps, lips extending inwardly of the hoop, spring catches having outturned ends normally springing beyond the hoop a cross bar engaging under the lips and means for raising the bar.

4. For an ice-cream lift, the combination with a can, of an ice-cream cage comprising a lower pan, a pair of straps extending vertically upwards from the pan, a hoop secured to the top ends of the straps, spring catches having outturned ends normally springing beyond the hoop, lips adjacent the hoop projecting inwardly thereof a cross bar engaging under the lips and means for raising the bar.

5. For an ice-cream can, an ice-cream lift adapted to slidably rest in the lower part of the can, a cross bar notched at the ends to rest over the top edge of the can, a lifting unit attached to the bar and adapted to be removably positioned with the bar on the top edge of the can, rotatable means carried by the lifting unit adapted to engage detachably said lift, and catch means carried by the lift adapted to spring out over the top edge of the can when the lift is sufficiently elevated.

In testimony whereof we affix our signatures.

DAVID C. RUSSELL.
HARMAN B. WOERNER.